(12) United States Patent
Camp

(10) Patent No.: US 9,729,544 B2
(45) Date of Patent: Aug. 8, 2017

(54) METHODS AND SYSTEMS FOR PASSCODE CREATION AND USER AUTHENTICATION

(71) Applicant: L. Jean Camp, Bloomington, IN (US)

(72) Inventor: L. Jean Camp, Bloomington, IN (US)

( * ) Notice: Subject to any disclaimer, the term of this patent is extended or adjusted under 35 U.S.C. 154(b) by 0 days.

(21) Appl. No.: 14/547,889

(22) Filed: Nov. 19, 2014

(65) Prior Publication Data

US 2015/0172274 A1    Jun. 18, 2015

Related U.S. Application Data

(60) Provisional application No. 61/906,153, filed on Nov. 19, 2013.

(51) Int. Cl.
*H04L 29/06* (2006.01)
*H04L 9/32* (2006.01)
*G06F 21/36* (2013.01)

(52) U.S. Cl.
CPC ............ *H04L 63/083* (2013.01); *G06F 21/36* (2013.01); *H04L 9/3226* (2013.01); *H04L 9/3271* (2013.01)

(58) Field of Classification Search
CPC ...................................... H04L 63/083
USPC .............................................. 726/6
See application file for complete search history.

(56) References Cited

U.S. PATENT DOCUMENTS

| | | | | |
|---|---|---|---|---|
| 9,030,293 | B1* | 5/2015 | Tabak | G06F 21/30 340/5.54 |
| 2010/0117792 | A1* | 5/2010 | Faith | G06Q 20/40 340/5.81 |
| 2013/0167225 | A1* | 6/2013 | Sanft | G06F 21/36 726/19 |
| 2013/0276083 | A1* | 10/2013 | Nuzzi | G06F 21/31 726/7 |
| 2015/0012988 | A1* | 1/2015 | Jeng | G06F 21/36 726/7 |
| 2015/0067825 | A1* | 3/2015 | Mese | G06F 21/36 726/19 |

* cited by examiner

*Primary Examiner* — William Goodchild
(74) *Attorney, Agent, or Firm* — Mattingly, Burke, Cohen & Biederman LLP

(57) ABSTRACT

The present disclosure provides a method of creating a unique passcode for a computer system with graphics which enhance a user's episodic memory. Disclosed systems and methodology further relate to passcode authentication in response to prompting an individual to enter a passcode via display of images.

12 Claims, 5 Drawing Sheets

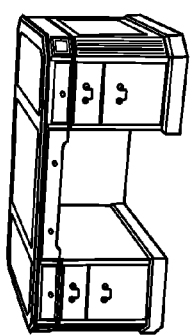
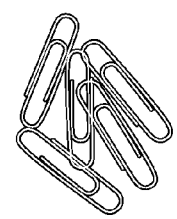
Fig.3
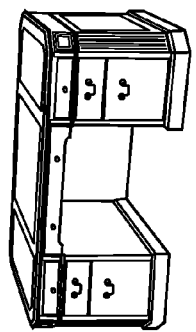
Fig.4
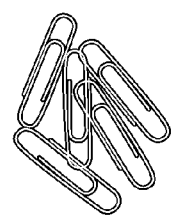
Fig.5

METHODS AND SYSTEMS FOR PASSCODE CREATION AND USER AUTHENTICATION

TECHNICAL FIELD

The present disclosure relates generally to creating easy-to-remember passcodes in systems or devices in which a passcode is required for access. More particularly, the present disclosure relates to creating and using a passcode for accessing or operating computerized machines using images to trigger and exploit intrinsic cognitive functions in relation to storage and retrieval of information via episodic memory.

BACKGROUND

Many different types of password, pin number, combination, and login information creation methods exist in electronic and non-electronic systems and devices. Historically, such patterns of information are needed for unique users to safely and securely access devices and systems such as computers, websites, cell phones, vehicles, physical access doors, and the like. Particularly, society requires of users an increasing number of unique passwords, login information, and access codes, collectively "passcodes," in everyday life. Users have been required to remember an increasing number of unique passcodes to identify themselves in a variety of situations, placing increased demand on users' semantic memories. Users are also required periodically, and with increasing frequency, to create substitute or updated passcodes to refresh login credentials.

Individuals have difficulty creating reliable, easy-to-remember passcodes. Password "bars" have been proposed where a graphic is presented that gives a user visual feedback on relative password strength, as have systems for the automatic creation of passwords. So-called password "hints" are implemented in some systems where users have already created a password, however, user specified password hints can create potential security risks and are irrelevant to ensuring the memorability of the password itself. There remains a need for strategies to generate and use unique, secure passcodes that are also easily remembered by a user.

SUMMARY

The present disclosure is directed toward using a system to store, present, process, and randomize information in a manner that simultaneously removes or reduces the requirement that a human user generate randomness or entropy and provides passcodes that are easier to use and remember. The disclosure proposes building on inherent cognitive behavioral patterns to generate easy-to-remember passcodes. A passcode can be a single password, a phrase, or any other combination of words and symbols. The passcodes generated will intrinsically meet passcode entropy requirements, while being easy-to-remember.

The presentation style of the disclosed method takes advantage of the following human heuristics. First, the images leverage episodic memory. In general, episodic memory deteriorates more quickly over time than semantic memory. However, there are advantages to exploiting episodic memory over semantic memory in relation to information recall, in particular contextual information. People under cognitive stress, such as people locked out of an account or device, and older adults are more likely to retain content than context. Context can be understood more as personal experience, including times, places, associated emotions. Semantic memory relates more to bare facts. Context is provided by episodic memory, according to current scientific understanding. Older adults and others, notably those with certain forms of cognitive decline, also suffer disproportionately from irrelevant intrusions, i.e. when faced with a decision they are less able to determine the pertinent information that should occupy them.

Graphics that are relatively richer in multi-sensory information trigger episodic memory, or perhaps more accurately trigger formation of episodic memories, and can likewise trigger the recall of episodic memories. Video-based or graphic narratives can provide richer comprehension than text. To generalize, videos are coded in the episodic memory as compared to text, which is coded in the semantic memory. Episodic memory, though richer, requires more so called memory blocks.

The ability to remember individual words or ideas can depend on the linkage of the words. In terms of time, between five and eight seconds are required to store something in long term memory. Memory is usually described as associative because of the way in which one thought retrieved from memory leads to another thought. Information is stored in memory in linked structures, according to current understanding.

The retrieval of certain forms of pertinent information also tends to be better in episodic memory than in semantic memory. Thus, there are several advantages to using techniques that trigger episodic memory. These advantages consist of richer comprehension and contextualization, as well as efficient and pertinent information retrieval.

Thereby, the security and uniqueness of passcodes generated according to the present disclosure are enhanced at the same time the user's ability to remember the passcode or unique identifier is enhanced. More specifically, in one embodiment, a system or device can generate two to five pictures, in some instances a range from one to five or more pictures, with or without intrinsic connections or a relationship among them, and individuals then construct a passcode or other unique login information from the pictures, their relationships, and other predefined and specified requirements. There can be multiple presentation styles for the graphics based on different types of devices or systems in which the passcodes or login information is needed. Individual images can form an image group. A video or video clip can also form an image group or a part of an image group.

In another embodiment, individuals can move or drag the images or photos around on a screen, either by touch or other direction such as a mouse or keyboard. The user can form the separate images into a single image, or a pattern that is easily remembered when shown the same arrangement of images. Such alteration of the image or images may be understood as an image altering instruction by the user. In such a system, the client sends a request to the server. The server responds with a message adequate to contain five photos and five additional codes that are required. The interaction allows the images to be moved around or for the user to select or remove certain images, with a resulting phrase constructed and used ultimately as a passcode.

The randomness of the passcode depends upon the size of the image library on the server, the entropy of selection, and the different language and perspectives of the individuals creating the passwords or login information. The size of the image library and the entropy of selection can be quantified. Images or photos can be selected by the computer system or similar device to remove the requirement for entropy from the user. The entropy and randomness of the passcode comes both from its length and the different characterizations of the images by different people with different life experiences and cultural contexts.

In one embodiment, the client receives a set of images, including a number of different images or characters to provide a minimal level of entropy. The client may request more entropy than the minimum entropy for the selected context. By requesting more than the minimum required entropy, a client could delete selected items to create a text sentence associated with the remaining images. The uniqueness of the sentence, password, or pass phrase created is partly a function of the individual construction.

In another embodiment, the manipulation is entirely on-client. In yet another embodiment, the manipulation could be done with a secure connection to a server. Entropy can be confirmed on the client or server, but confirming on the server requires knowing the pass phrase.

Therefore, the present disclosure presents a method for creating unique user login information and prompting user memory of said information comprising the steps of prompting a user interacting with a system on a client machine with an image group comprising at least one individual image on a screen; receiving from the client machine unique user login information based on the image group; subsequently displaying to the user the same image group on a screen; and receiving the unique user login information based on the image group to allow access to the system.

In another embodiment, the image group has between one and five images, more preferably between two and five images. In still another embodiment, prompting a user further includes the step of allowing the user to input image altering commands. In yet another embodiment, image altering commands are selected from the group consisting of moving an image to the right, moving an image to the left, moving an image up, moving an image down, transposing an image group, rotating an image, rotating an image group, deleting an image, adding an image, sorting an image group, and requesting a new image group.

Finally, in another embodiment, prompting a user further includes the step of alerting the user to minimum entropy requirements of entropy rules.

BRIEF DESCRIPTION OF THE DRAWINGS

The features of this disclosure, and the manner of attaining them, will become more apparent and the disclosure itself will be better understood by reference to the following description of embodiments of the disclosure taken in conjunction with the accompanying drawings.

FIGS. 2-5 illustrate exemplary groups of images to enhance episodic memory in connection with creating a passcode;

Figure 1:
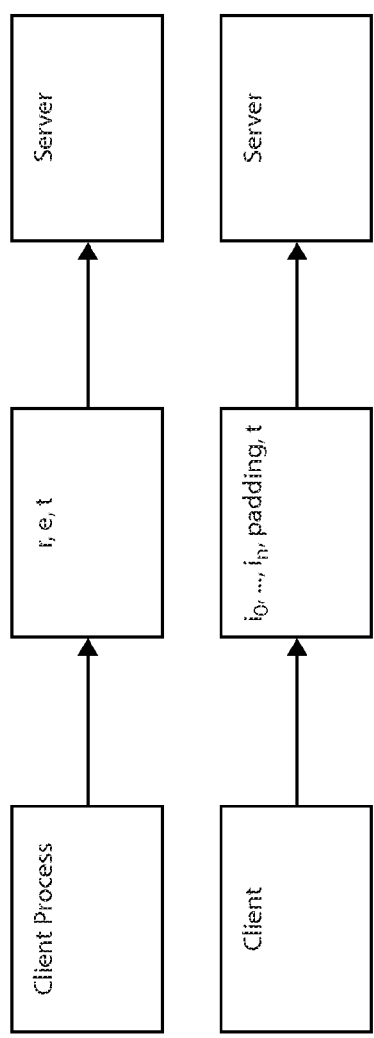
FIG. 1 is a block diagram which illustrates an exemplary protocol implementation between the client or user and the server.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplifications set out herein illustrate an exemplary embodiment of the disclosure, in one form, and such exemplifications are not to be construed as limiting the scope of the disclosure in any manner.

DETAILED DESCRIPTION

The embodiments disclosed herein are not intended to be exhaustive or limit the disclosure to the precise form disclosed in the following detailed description. Rather, the embodiments are chosen and described so that others skilled in the art may utilize their teachings.

Referring first to FIG. 1, an exemplary protocol implementation between the client process and the server is provided. First, the client and server engage in any form of key exchange to create key k. The messages are then encrypted in this session key. Each $i_x$ in FIG. 1 indicates a randomly chosen image or subset of an image. In some embodiments, the client process requests are based on a provided set of rules to meet based on a minimal level of entropy. The client also provides a timestamp and a nonce to prevent dictionary attacks.

Figure 2:
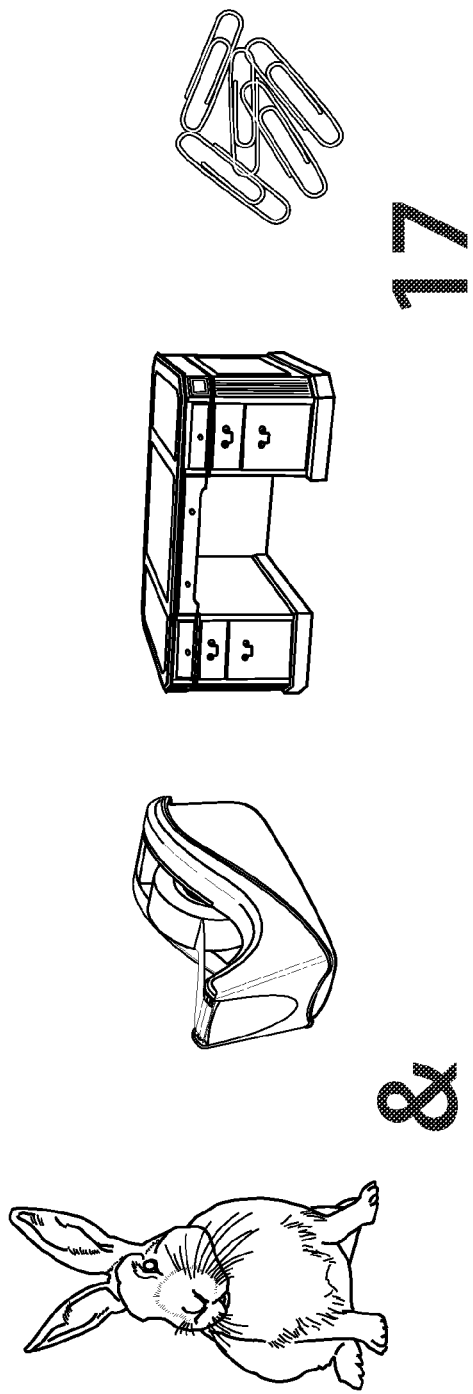

Referring now to FIG. 2, an exemplary group of images to enhance episodic memory is shown. In some embodiments, the client receives a set of images, including images of characters to provide the minimal level of entropy, e. Based on FIG. 2 and a level of entropy requiring a capital letter and a symbol, a user might create the sentence, "Seventeen paper clips & a bunny taped to the desk." Based on FIG. 2 and a level of entropy requiring a capital letter, but no symbol, a user might create the sentence, "Seventeen paper clips and a bunny taped to the desk." Based on FIG. 2 and a level of entropy not requiring a capital letter or a symbol, a user might create the sentence, "seventeen paper clips and a bunny taped to the desk." In an exemplary embodiment, FIG. 2 may have more entropy than is necessary, and a user can exclude or remove the rabbit from the group of images, or perform other ad hoc additions or subtractions of content.

The client may request far more entropy than necessary for the selected context. In this way, the client can delete selected items to create a text sentence. The uniqueness of the sentence is also a function of the individual construction. For example, based on the images of FIG. 2, if a user removed the paperclips and the ampersand symbol, a password or pass phrase or login information for the user might be "seventeen bunnies taped to the desk." To provide more entropy, capital letters may be required, potentially resulting in a passcode such as "Seventeen bunnies taped to the desk."

Referring now to FIG. 3, an exemplary group of images to enhance and exploit episodic memory in the context of passcode creation is shown. FIG. 3 shows one less image than FIG. 2, because the rabbit is omitted. Based on the level of entropy required, exemplary sentences a user may derive from FIG. 3 include "Tape & paper clips in desk 17," "Tape and paper clips in desk 17," "tape and paper clips in desk 17," and "tape and paper clips in desk seventeen." Minimal entropy will result from assuming no capital letters or punctuation, and requiring a minimal set or use of words in the phrase.

Referring now to FIG. 4, another exemplary group of images to enhance and exploit episodic memory is shown. In FIG. 4, a different group of images is shown than the group of images shown in FIG. 3. In one exemplary embodiment, the user can select a replacement picture if no sentence comes to mind, as some images may not seem to a user to logically fit into a set, sentence, or phrase. Thus, a user may select to change the images from the group of images in FIG. 3 to the group of images in FIG. 4, and FIG. 4 may in the user's mind offer a better phrase or sentence to create. This can enhance memory.

Referring now to FIG. 5, another exemplary group of images to enhance and exploit episodic memory is shown. In one embodiment, by rearranging FIG. 4 and removing the number 42, a user could arrive at FIG. 5. An exemplary pass phrase derived from FIG. 5 is "jumping on the desk holding paper clips & tape!". If the number 42 were not removed, an exemplary pass phrase derived from FIG. 5 is "jumping on the desk holding 42 paper clips & tape!". Minimal entropy may be defined as having the same number of words as the number of images. Where passcodes are proposed by a user that do not meet the minimum level of entropy, they may be rejected by the server computer (or the computer upon which they are entered), and the user prompted to try again.

Figure 6:
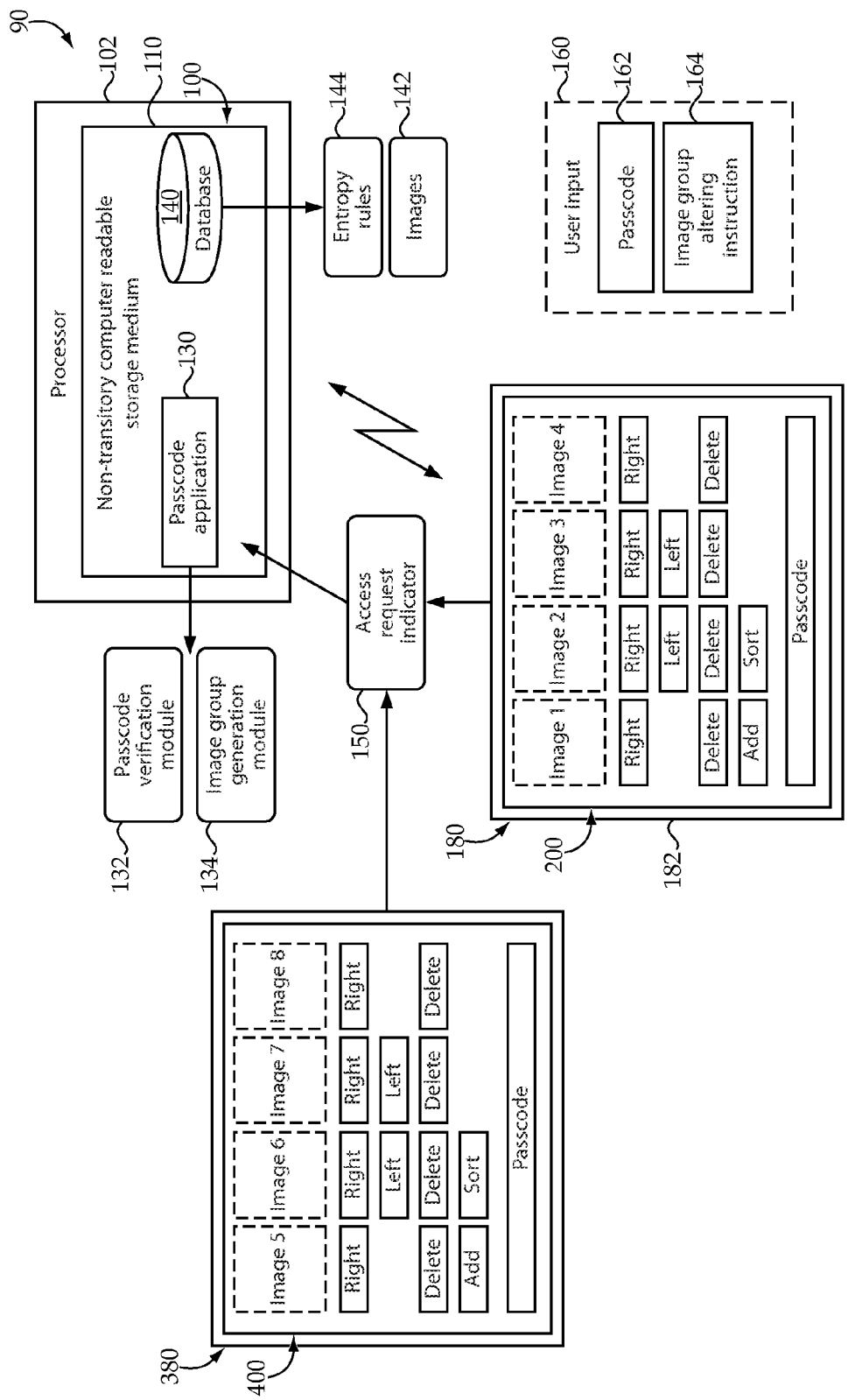
FIG. 6 illustrates an exemplary system for secure passcode creation and implementation.

Referring now to FIG. 6, an exemplary secure passcode creation and implementation system in the context of a computer network 90 is shown with a first user display or user display screen 180 of a first computerized machine, having displayed thereon an image group 200 along with image altering instructions 182. A second user display screen 380 of a second computerized machine having displayed thereon a second image group 400 is also shown. In association with display 180 is a user input 160 including a passcode entry box 162 and an image group altering function. The passcode information could be entered via a conventional input device such as a keyboard, mouse, touchscreen, or microphone, for example. The image group altering function could be carried out via similar input devices. The number of display screens and computerized machines may be far larger than two, and it is contemplated that for institutional applications many hundreds or even many thousands of computerized machines such as desktop or laptop computers, mobile handheld computers, computerized machinery, sensing mechanisms, computerized vehicles, and even computerized locks and the like could be part of computer network 90. Those skilled in the art will thus appreciate that passcode creation and user access to computerized machines in a computer network according to the present disclosure may be implemented on small, or very large scales and it is contemplated that the teachings set forth herein may be applied not only to setting up computer networks for operation, but also to upgrading existing computer networks to improve operation by way of better security of user access to the various computerized machines.

It is contemplated that reduced lockouts, where a user cannot access one or more computerized machines to which they are intended to have access, will result where the present disclosure is implemented. It is also contemplated that reduced need for password resetting procedures, and reduced intervention by system administrators will be required. It will thus be readily apparent that supplanting state of the art passcode creation with the techniques set forth herein will reduce the diversion of both machine resources and human resources toward solving user authentication and login problems. Returning to the operation of system 90, when a user enters a passcode, an access request indicator 150 signals a passcode application 130. The passcode application 130 accesses either a passcode verification module 132 or an image group generation module 134. A database 140 stores entropy rules 144 and images 142 in the form of an image library, typically loaded on database 140. Entropy rules 144 establish the minimum entropy that must be input by a user for valid unique user login information. In one embodiment, minimum entropy rules would require the user to input as many individual words as passcode information as there are individual images displayed in an image group. In other embodiments, minimum entropy rules would require capital letters, symbols, characters, or particular combinations. In still other embodiments, minimum entropy or compliance rules could require some contextual association between the content of the image group and the passcode generated. Stated another way, a check can be made, typically locally, to ensure at least one of an indexing term and/or a descriptive term associated with one or more of the images in a given image group is matched by a word in the passcode. For instance, given the presence of a rabbit image and a piece of cheese image in an image group, such rules might require the presence of at least one of the words rabbit, bunny, hopping, rodent, and at least one of the words cheese, dairy, curds, Swiss or cheddar in the passcode generated. In another example, entropy or compliance rules might require at least four nouns where four images are presented, in an image group. It is nevertheless contemplated that the random selection via a processor of images from the database in populating each image group, and a sufficient diversity of images in the database, will intrinsically result in sufficient entropy. Checks in the nature of entropy rules and/or compliance rules can be implemented as a means to ensure that users play by the rules and actually enter passcodes in the manner intended by the system. A user input is shown by way of numeral 160, a Passcode 162 and an image group altering instruction 164 shown as parts of user input 160.

Figure 7:
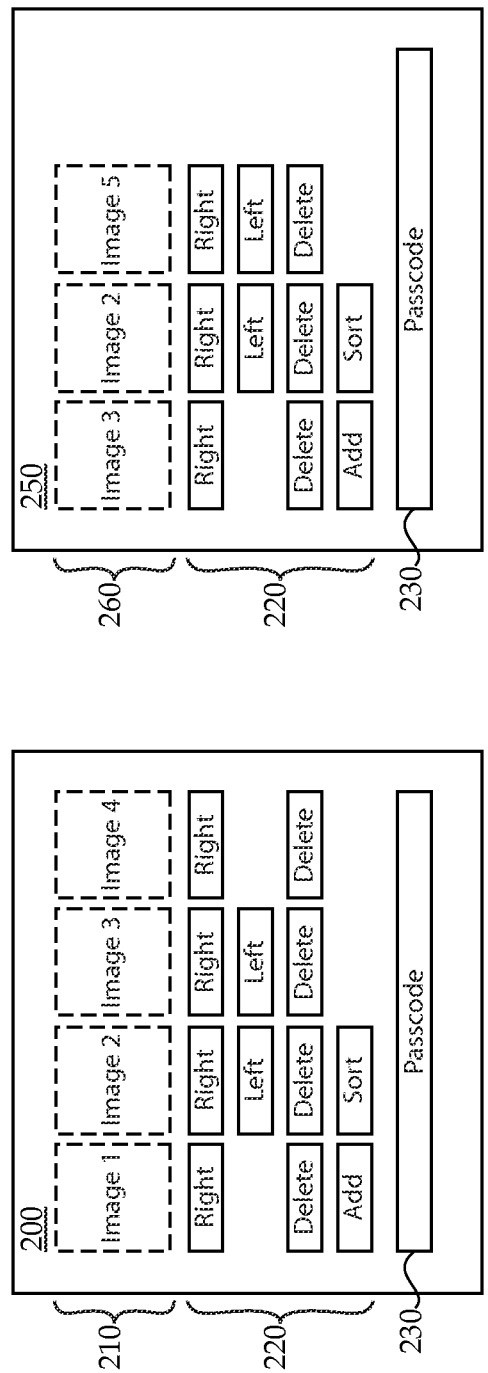
FIG. 7 illustrates an exemplary user screen for secure passcode creation.

Referring also to FIG. 7, an exemplary initial user screen 200 is shown with image group 210, image altering instructions 220, and a passcode entry box or the like 230. It can be seen that instructions 220 allow a user to move images right, left, delete images, request images be added, sorted or resorted. Passcode entry box 230 can be used for the user to type in the passcode they propose to create based on the image group, typically a series of textual characters. Also shown in FIG. 7 is an exemplary screen 250 representing screen 200 after the user inputs image altering instructions. As shown, image 4 has been deleted, image 3 has been moved, and image 5 has been added. It can also be seen that in screen 250, the available image altering instructions have changed. In other embodiments, the image altering instructions may be in the form of a user request to rearrange the same set of images, populate the image group with all new images, or execute some other change.

Figures 8, 9:
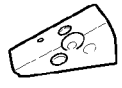
FIG. 8 illustrates another exemplary user screen for secure passcode selection.
FIG. 9 illustrates an exemplary user screen for passcode entry and user authentication.

Referring now to the drawings generally, but also to FIG. 8, there is shown an example user screen 300 where, similar to the FIG. 7 illustration, an image group has been displayed on a display screen of a computerized machine of a computer network. In FIG. 8, the images are shown as they might appear where the user is being prompted via the displaying of the image group to initially enter passcode information based on the image group, in the form of a sentence using at least some of the displayed images. A password phrase may be generated by the computerized machine based on the sentence entered. The user may then verify the password phrase one or more times. It should be appreciated that verification might not be used at all, however. The passcode information received can be stored in computer memory on a computerized machine in a computer network such as network 90. Referring also now to FIG. 9, once passcode information is entered and stored appropriately, the passcode information can be used to authenticate users for log in to access one or more computerized machines of network 90.

Stated another way, an authenticated session can be initialized where passcode information is entered and verified, or access denied where the passcode information cannot be verified. As further discussed herein, verification of passcode information may include comparing subsequently entered passcode information with the passcode information entered initially, and an authentication signal generated in response to the comparison.

In a practical implementation strategy, a user may be presented with user screen 350 where at least one of the images of the image group used in creation of their passcode is redisplayed, on the display screen of the same or a different computerized machine than the machine upon which the passcode information was initially entered. In the illustrated embodiment it can be seen that the image of a piece of cheese that was previously displayed in the image group of FIG. 8 is shown. The cheese image may serve as a prompt to the user to subsequently enter passcode information. In other embodiments, an image component such as a cropped part of one of the images used in the corresponding image group might be redisplayed. In still other instances, the image component might be a similar image conveying the same or similar information as one of the images from the image group. For instance, displaying an image of one species of monkey could be understood as displaying a component of an image of another species of monkey. In a practical implementation strategy, for authentication purposes a user might be provided the option of viewing more than one of the images used in the image group used in initially creating the passcode.

In any event, passcode information subsequently entered by the user may be received, and a comparison performed where the subsequently entered passcode information is compared with the initially entered passcode information via a processor of the computer network. The processor may then output an authentication signal so as to log in the user to access at least one of the computerized machines, responsive to the comparison. Further to the signal, communications between the machine the user is presently interacting with and at least one other machine might be established, or communications of a certain type between the user's machine and the at least one other machine established or permitted. It will further be appreciated that the procedures described herein, where passcodes are created for one user and later used to authenticate the user for access, can also be applied to all of the users of a computer network. Accordingly, in an institutional setting each of the users of a computer network might be prompted to create new passcodes in the manner described herein, displaying image groups to a plurality of users on display screens of a plurality of computerized machines. The image groups might all be unique, either by design or incidental to the size of the stored image library. Even if some identical image groups are displayed, it is contemplated an effectively zero chance of the same passcode being generated by two different users will exist. Upon attempting to subsequently log in the users may be prompted via redisplay of one or more of the images used in initially creating the passcodes. Users might create passcodes upon and log in to the same computerized machine, such as their dedicated laptop or desktop computer. In other instances, users might create passcodes on one machine, and then log in to the computer network on another machine. In still other examples, the passcode might be dedicated to access for a single computerized machine.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A method of improving security of access to computerized machines in a computer network comprising:
    loading an image library on a database of the computer network;
    populating an image group with less than all of a plurality of images in the image library;
    displaying the image group on a display screen of one of a plurality of the computerized machines so as to prompt a user to initially enter passcode information based on the image group;
    receiving passcode information that includes a plurality of passcode textual characters initially entered by the user in response to the prompt to initially enter passcode information;
    determining an entropy rule for the passcode information initially entered by the user is satisfied;
    redisplaying a component of the image group on the same display screen or another display screen of one of the plurality of computerized machines of the computer network, so as to prompt the user to subsequently enter passcode information;
    receiving passcode information subsequently entered by the user using an input device in response to the prompt to subsequently enter passcode information;
    comparing the subsequently entered passcode information with the initially entered passcode information via a processor of the computer network; and
    outputting an authentication signal so as to initialize an authenticated session for the user on the computer network, responsive to the comparison.

2. The method of claim 1 wherein redisplaying includes redisplaying at least one but less than all of the images of the image group.

3. The method of claim 1 wherein displaying the image group includes displaying the image group repopulated responsive to a user request for new images.

4. The method of claim 1 wherein displaying the image group includes displaying an image group rearranged on the display screen responsive to a user request.

5. A method of operating a computer network comprising:
    populating a plurality of different image groups with images from a stored image library, such that each of the different image groups includes less than all of the images in the image library;
    displaying the plurality of different image groups on display screens of a plurality of computerized machines of the computer network, so as to prompt users of each one of the plurality of computerized machines to initially enter passcode information based on the corresponding image group;
    receiving passcode information that includes a series of passcode textual characters initially entered by the users of each of the plurality of computerized machines in response to the prompt to initially enter passcode information;
    determining an entropy rule for the passcode information initially entered by the plurality of users is satisfied;

redisplaying a component of each one of the corresponding image groups on each of the display screens, so as to prompt each of the users to subsequently enter passcode information;

receiving passcode information subsequently entered by each of the users in response to the prompt to subsequently enter passcode information;

comparing the subsequently entered passcode information for each of the users with the corresponding initially entered passcode information via a processor of the computer network; and outputting authentication signals responsive to each of the comparisons so as to log in, or deny access to, each of the users to at least one of the computerized machines.

6. The method of claim 5 further comprising repopulating at least one of the image groups responsive to a request to repopulate entered by one of the users on the corresponding one of the computerized machines.

7. The method of claim 5 wherein the initially entered passcode information for each of the users includes a unique series of text characters, and at least one of the images in each of the image groups includes a non-text image.

8. A computer implemented method for creating unique user login information and prompting user memory of said information comprising the steps of:

prompting a user interacting with a system on a client machine with an image group comprising a plurality of individual images on a screen;

receiving from the client machine unique user login information based on the image group that is entered in response to the prompting and includes a series of passcode textual characters forming a plurality of words, and wherein a number of the plurality of words is at least as great as a number of the plurality of individual images;

subsequently displaying to the user the same image group on the same display screen or another; and receiving the unique user login information based on the image group to allow access to the system.

9. The method of claim 8, wherein the image group has between one and five images.

10. The method of claim 8, wherein prompting the user further includes the step of allowing the user to input image altering commands.

11. The method of claim 10, wherein image altering commands are selected from the group consisting of: moving the at least one individual image to the right, moving the at least one individual image to the left, moving the at least one individual image up, moving the at least one individual image down, transposing the image group, rotating the at least one individual image, rotating the image group, deleting the at least one individual image, adding the at least one individual image, sorting the image group, cropping the at least one individual image, and requesting a new image group.

12. The method of claim 8, wherein prompting the user further includes the step of alerting the user to minimum entropy requirements of entropy rules.

* * * * *